Dec. 3, 1957  J. J. SPICER, JR  2,815,412
TURN SIGNAL SWITCH
Filed July 5, 1956
2 Sheets-Sheet 2
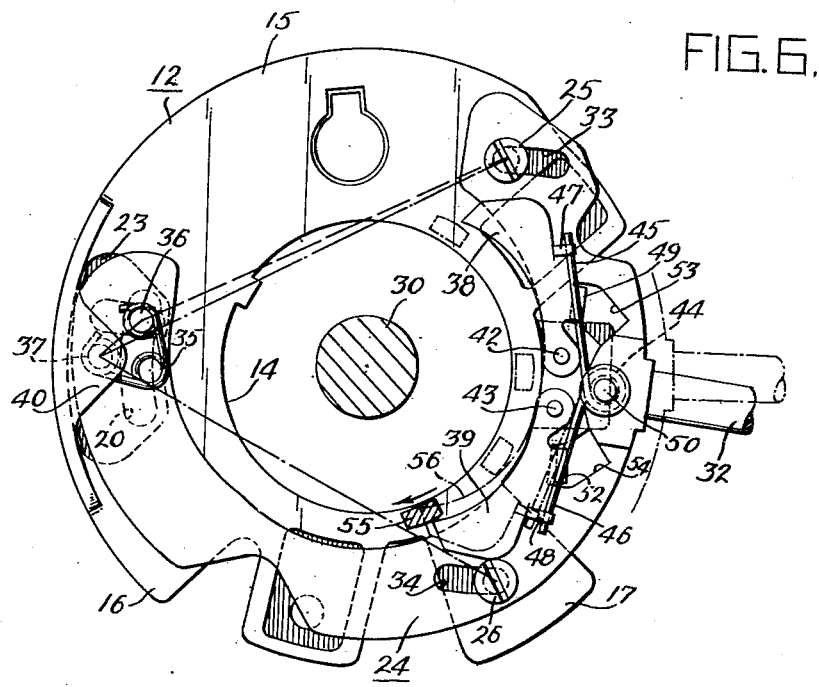
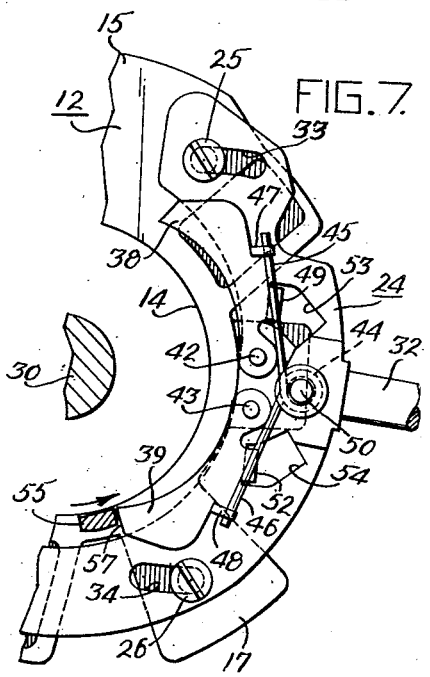
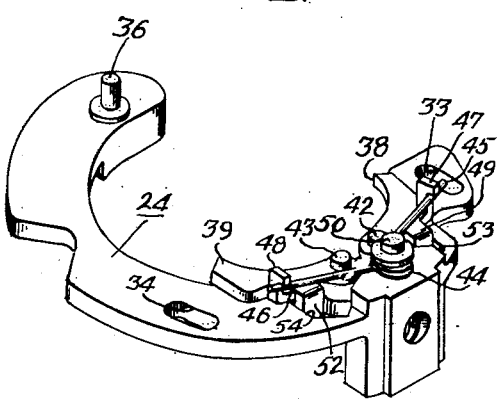
INVENTOR:
JOHN J. SPICER, JR.
BY Howson & Howson
ATTYS.

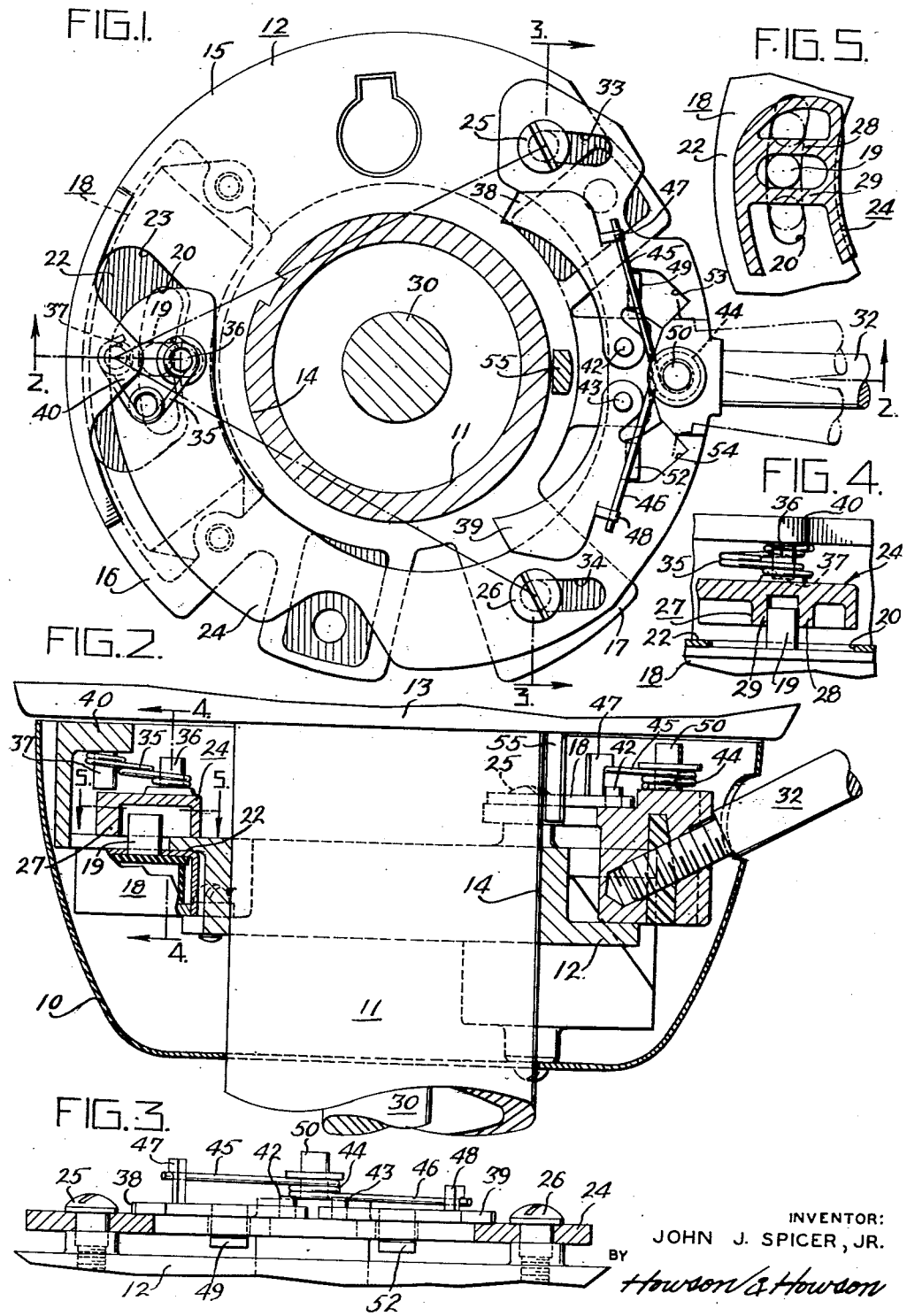
Dec. 3, 1957     J. J. SPICER, JR     2,815,412
TURN SIGNAL SWITCH
Filed July 5, 1956     2 Sheets-Sheet 1
INVENTOR:
JOHN J. SPICER, JR.
BY Howson & Howson
ATTYS.

United States Patent Office 2,815,412
Patented Dec. 3, 1957

2,815,412

TURN SIGNAL SWITCH

John J. Spicer, Jr., Philadelphia, Pa., assignor to United Specialties Company, Philadelphia, Pa., a corporation of Delaware Application July 5, 1956, Serial No. 595,917

4 Claims. (Cl. 200—61.34)

This invention relates to a turn signal switch actuating mechanism designed for use with automobiles and similar vehicles. As is usual in devices of this type, it includes a combination by which the signal is set manually by the operator of the vehicle before making the turn, in order to indicate intention to make the turn and its direction, and this signal is automatically cancelled out upon completion of the turn.

The invention may be regarded in a more detailed sense as a specific improvement in the turn signal switch and actuating mechanism of my prior patent, 2,739,196 of March 20, 1956, and my primary objects in conceiving and perfecting the present invention have been to provide improvements over that and other available turn signal switches in economy, simplicity and reliability of operation. These and other objects and advantages of the invention and the manner in which they have been attained, will be evident from reading of the following detailed description in the light of the attached drawing, in which, Figure 1 is an enlarged detail view, partly in plan and partly in cross-section, illustrating the turn signal switch mechanism and its associaiton with the steering column, Figure 2 is a cross-section on the line 2—2 of Figure 1, Figure 3 is a cross-section on the line 3—3 of Figure 1, Figures 4 and 5 are cross-sections on the lines 4—4 and 5—5, respectively, of Figure 2, Figure 6 is a plan view corresponding to Figure 1, showing the parts in position to signal the making of a right turn, Figure 7 is a view corresponding to the right side of Figure 6, illustrating the relative positions of the parts as the turn is about to be completed, and Figure 8 is a perspective view of the signal actuating member and its association with the signal cancellation members.

As illustrated in Figure 2 of the drawing, the turn signal mechanism of the invention may be mounted within a housing 10 surrounding the upper end of the steering column 11, and this mechanism is secured about the steering column by a mounting ring 12 having a central cylindrical portion 14 secured telescopically about the column beneath the hub 13 of the steering wheel. As will be seen from Figures 1 and 6, flanges 15, 16 and 17 extend radially and arcuately from the upper end of cylinder 14, and these flanges serve as mountings for the switch actuation member and switch, as discussed hereinafter.

The switch 18 (Fig. 2) is secured beneath the space between flanges 15 and 16 and includes an actuating stud 19 projecting upwardly through an arcuate slot 20 in the top wall 22 of the switch housing. The switch contacts (not shown) are made and broken by movement of the stud in opposite directions from its central position, in a manner familiar to those skilled in this art. The upper wall 22 of the switch housing underlies portions of flanges 15 and 16 at its opposite ends, and the portion including slot 20 underlies a slot or open space 23 between these flanges. The upwardly projecting stud 19 is thus accessible from above for actuation by a pivotally mounted actuating member 24 (Figs. 1, 6 and 8), which is mounted for limited pivotal movement as discussed below, upon studs 25 and 26 extending upwardly from flanges 15 and 17, respectively.

The actuating member 24 includes a downwardly-facing yoke portion 27 (Figs. 2, 4 and 5) having radially extending opposed side walls 28 and 29 which embrace stud 19 and thus move it from the central inoperative position of Figure 5 to one of the positions indicated in broken lines in Figure 5, upon pivotal movement of actuating member 24 to signal the intention to make a right or left hand turn. An actuating handle or arm 32 extends radially and laterally from its securement to actuating member 24 adjacent steering column 11 and post 30, and passes through a slot (Fig. 2) in housing 10 which permits the necessary degree of movement to cause stud 19 to move between its opposite positions to actuate switch 18 to energize its right and left turn signals, respectively.

The studs 25 and 26 upon which actuating member 24 is mounted are preferably located arcuately upon opposite sides of the location of handle 32 when in inoperative or "off" position. An arcuate slot 33 serves as the mounting for member 24 upon stud 25 and a second arcuate slot 34 serves as a similar mounting upon stud 26. Slot 33 is formed upon the arc of a circle having its center at the location of stud 26 at the inner end of slot 34, and slot 34 is formed upon the arc of a circle having its center at the location of stud 25 at the inner end of slot 33, as these parts are illustrated in Figure 1. The actuating member 24 and handle 32 are movable to signal the intention to make a right turn by pulling handle 32 downwardly from the inoperative full line position of Figure 1 to the lower broken line position; i. e. to the full line position of Figure 6. This causes actuating member 24 to pivot about stud 25, as guided by the bearing of stud 26 in slot 34, with the result that the stud 19 is moved by yoke 27 to the upper broken line position of Figure 5, to energize the right turn signal until this is cancelled by completion of the turn.

In case a left hand turn is to be made, handle 32 is pushed upwardly in a counterclockwise direction to the upper broken line position of Figure 1, thereby causing actuating member 24 to pivot about stud 26 while it remains engaged with the inner end of slot 34 as illustrated in Figure 1, until the outer end of slot 33 abuts stud 25. Stud 19 is thus moved to the lower broken line position of Figure 5 to energize the left turn signal.

An over-center spring device is employed to maintain the actuating handle 32 and member 24 in their inoperative or "off" position as illustrated in full lines in Figure 1, or in either of its selected "on" positions, until changed by manual operation or automatic cancellation as discussed hereinafter. The over-center device consists of a compression spring 35 secured at its inner end about an upwardly extending stud 36 upon a portion of member 24 opposite to handle 32, and at its outer end to a stud 37 extending downwardly from a stationary lug 40. In the "off" position illustrated in Figure 1, the spring forces actuating member 24 into position in which the inner ends of slots 33 and 34 abut studs 25 and 26, respectively, as illustrated. As handle 32 is pulled downwardly to the position of Figure 6, spring 35 is compressed until the line joining studs 36 and 37 passes to the left of the line joining studs 25 and 37, and it is then permitted to expand, so that the position illustrated in Figure 6 is held under spring pressure. In making a right turn signal, the line between studs 37 and 36 passes to the right of the line joining studs 37 and 26, so that the mechanism also holds this position automatically, once it is set.

The device also includes a pair of cancellation members in the form of arms 38 and 39 pivoted upon actuating member 24 at 42 and 43, respectively. A spring 44 has a central coiled portion mounted upon a stud 50 extending upwardly from actuating member 24 adjacent handle 32, and this spring has opposite ends 45 and 46 bearing resiliently against lugs 47 and 48, respectively of arms 38 and 39. Pivotal inward movements of arm 38 in a counterclockwise direction and of arm 39 in a clockwise direction are limited by lugs 49 and 52 extending downwardly and inwardly from the outer edges of these arms, and slots 53 and 54 are provided to permit the desired limited movement of cancellation arms 38 and 39 while limiting the inner locations of the ends of these arms.

A projection 55 is secured for rotation with steering post 30, and normally occupies a central position between arms 38 and 39 as illustrated in Figure 1. This projection may be fixed to the under side of the hub 13 of the steering wheel, and in normal turning of the wheel with the turn signal in "off" position, as illustrated in Figure 1, it will not abut either of arms 38 and 39, as it rotates within the inner edges of these arms. When arm 32 is moved to indicate a right turn, however, and that turn is thereafter made, projection 55 will pass progressively through the lower three positions illustrated in Figure 6. As it abuts the curved surface 56 in this clockwise rotation, this will force arm 39 outwardly against the pressure of spring arm 46, as illustrated in broken lines in Figure 6. As the turn is continued beyond this point, projection 55 will move in a counterclockwise direction until it no longer lies within surface 56, and arm 39 will therefore be restored by spring arm 46 to the position of Figure 7.

Upon completion of the turn and return of the steering wheel toward its original position, projection 55 will abut the end 57 of arm 39 as illustrated in Figure 7. Since this arm is prevented from further clockwise rotation by abutments of its lug 52 against the lower side of slot 54, the force exerted by projection 55 against the edge 57 of arm 39 will cause rotation of the entire assembly including actuating member 24 and handle 32 to its original position as illustrated in full lines in Figure 1. When this position has been reached, arm 39 will have been moved to a position in which the projection 55 will now clear arm 39 in its return to original position. The entire signal mechanism is thus automatically reset as the steering wheel is returned to original position. If, after signalling intention to make a right hand turn, the driver makes a left turn instead, this will cause cancellation of the right turn signal as the steering wheel rotates counterclockwise in making the turn, in the same manner illustrated in Figure 7 and discussed above in connection with return of the steering wheel after a right hand turn. It should be noted that the edge 57 of the cancellation member makes a slight acute angle with the advance edges of the returning lug 55, as the lug abuts that face in cancelling the signal. If, therefore, the apparatus should become jammed or the arm 32 be rigidly held, this will not interfere with steering, as the cancellation member 39 or 38 will in that case be rotated on its pivot 43 or 42 by lug 55 in its return as indicated in Figure 7, in the same direction as illustrated in Figure 6 for making of the turn. If there should be a threat of jamming, this will thus be relieved without cancelling the signal.

From the foregoing discussion of the operation of the mechanism when a right turn is made after signalling an intention to make such turn, the corresponding operation of the mechanism to effect cancellation in the making of a left turn will be understood. From inspection of Figures 6 and 7 of the drawing, it will be evident that the arm 38 is thrown into the intended path of the projection 55 by the movement of handle 32 upwardly to signal intention to make a left turn, and that the projection 55 will abut the leading end of arm 38 in completing such turn, so that the signal will automatically be cancelled as the turn is about to be completed. Members 38 and 39 are similar in general construction, and designed to perform identical functions in cancelling out the right and left turn signals respectively. While the invention has been described specifically in regard to only one embodiment, persons skilled in the art will be aware that it may be refined or modified in various ways within its generic scope. I therefore wish it to be understood that this invention is not to be limited in interpretation except by the scope of the following claims.

I claim:

1. In an actuating mechanism for a directional switch for automobiles and like vehicles, the combination comprising an actuating arm extending laterally from a mounting adjacent the steering post, a signal actuating member having an intermediate portion thereof secured to said arm and having portions extending in opposite directions from said connection to said arm in a plane substantially perpendicular to said steering post and adjacent thereto, said portions extending in opposite positions having arcuate slots therein spaced on either side of said intermediate portion, pivotal supports for said actuating member extending through said arcuate slots and providing lost motion connections spaced arcuately from each other and interconnected with said member to permit and control pivotal movements thereof in opposite directions, means controlled by the pivotal movements of said actuating member for actuating a switch element to indicate right and left turns, respectively, in the extreme positions of said member, a pair of concellation members individually pivotally mounted and arcuately spaced from each other upon said actuating member on opposite sides of said actuating arm, means for resiliently urging the free ends of said concellation members toward said steering post, and a projection from said steering post adapted to abut one or the other of said cancellation members upon actuation of said post to make the indicated turn after actuation of said member to turn-indicating position, one of said cancellation members having a curved inner cam portion shaped to cause resiliently-resisted movement thereof by impact of said projection in making the indicated turn and a second straight cam portion on the free end thereof shaped to impel said cancellation member and said actuating member to inoperative position upon return of said steering post, and the other cancellation member having similar but oppositely directed portions shaped to cause corresponding movements of said other cancellation member and actuating member in making an indicated turn in the opposite direction, said cancellation members being solely and individually operable in either signal actuating or cancelling position.

2. An actuating mechanism as defined in claim 1, in which said actuating member is an arcuate arm extending around a substantial portion of the steering post.

3. An actuating mechanism as defined in claim 1, in which said cancellation members are resiliently urged to operative position by oppositely-extending arms of a single spring member.

4. In an actuating mechanism for a directional switch for automobiles and like vehicles, the combination comprising an actuating arm extending laterally from a mounting adjacent the steering post, a signal actuating member having an intermediate portion thereof secured to said arm and having portions extending in opposite direction from said connection to said arm in a plane substantially perpendicular to said steering post and adjacent thereto, pivotal supports for said actuating member providing lost motion connections spaced arcuately from each other and interconnected with said member to permit and control pivotal movements thereof in opposite directions, means controlled by the pivotal movements of said actuating member for actuating a switch element to indicate right and left turns, respectively, in the extreme positions of said member, a pair of cancellation members pivotally mounted and arcuately spaced from each other upon said actuation member, means for resiliently urging the free ends of said cancellation members upon actuation of said post to make the indicated turn after actuation of said member to turn-indicating position, one of said cancellation members having a portion shaped to cause resiliently-resisted movement thereof by impact of said projection in making the indicated turn and a second portion shaped to impel said cancellation member and said actuating member to inoperative position upon return of said steering post, and the other cancellation member having similar but oppositely directed portions shaped to cause corresponding movements of said other cancellation member and actuating member in making an indicated turn in the opposite direction, and means for resiliently retaining said actuating member in its respective signal-indicating positions, said means comprising an over-center spring attached to a portion of said actuating member substantially diametrically opposite its attachment to said actuating arm.

References Cited in the file of this patent

UNITED STATES PATENTS

| | | |
|---|---|---|
| 2,678,358 | Thomson | May 11, 1954 |
| 2,728,825 | Lincoln et al. | Dec. 27, 1955 |
| 2,733,309 | Elliott | Jan. 31, 1956 |
| 2,739,196 | Spicer | Mar. 20, 1956 |
| 2,739,197 | Lingenbrink | Mar. 20, 1956 |